(12) United States Patent
Weisbruch et al.

(10) Patent No.: US 12,037,064 B2
(45) Date of Patent: Jul. 16, 2024

(54) MASTER LINK AND ARTICULATED CHAIN ASSEMBLY FOR MACHINE

(71) Applicant: Caterpillar Inc., Peoria, IL (US)

(72) Inventors: Eric B. Weisbruch, Edwards, IL (US); Jeffrey Paul Nash, Peoria, IL (US); Donovan Stuart Clarke, East Peoria, IL (US); Kevin Lee Steiner, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 707 days.

(21) Appl. No.: 17/122,573

(22) Filed: Dec. 15, 2020

(65) Prior Publication Data

US 2022/0185400 A1  Jun. 16, 2022

(51) Int. Cl.
*B62D 55/21* (2006.01)

(52) U.S. Cl.
CPC .................................. *B62D 55/213* (2013.01)

(58) Field of Classification Search
CPC ..... B62D 55/213; B62D 55/21; F16B 35/041; F16B 35/044; F16B 35/048
See application file for complete search history.

(56) References Cited

U.S. PATENT DOCUMENTS

| | | | |
|---|---|---|---|
| 2,383,068 A | 8/1945 | Kesler et al. | |
| 3,096,661 A * | 7/1963 | Reinsma | B62D 55/213 |
| | | | 305/186 |
| 3,763,909 A * | 10/1973 | Stover, III | F16B 39/284 |
| | | | 411/929 |
| 3,947,074 A | 3/1976 | Nelson | |
| 4,050,750 A * | 9/1977 | Yoshihashi | B62D 55/213 |
| | | | 305/202 |
| 4,365,848 A | 12/1982 | Grilli | |
| 4,457,565 A * | 7/1984 | Bissi | B62D 55/213 |
| | | | 305/202 |
| 4,636,014 A * | 1/1987 | Dennison | B62D 55/213 |
| | | | 305/202 |
| 4,637,764 A * | 1/1987 | Imai | F16B 23/0061 |
| | | | 411/386 |
| 5,183,286 A * | 2/1993 | Ayabe | B60G 7/02 |
| | | | 280/124.144 |
| 7,275,903 B2 * | 10/2007 | Schultz | F16B 33/06 |
| | | | 411/395 |
| 10,618,103 B2 * | 4/2020 | Rathod | F16C 9/045 |

(Continued)

FOREIGN PATENT DOCUMENTS

| | | | | |
|---|---|---|---|---|
| JP | 07323871 A | * | 12/1995 | ........... B62D 55/213 |
| JP | 2007199024 A | | 8/2007 | |

OTHER PUBLICATIONS

Paul Boughton, "Bolts with waisted shanks put rail company back on track", Feb. 1, 2013, Engineer Live, 2 pages. (Year: 2013).*

*Primary Examiner* — Jason R Bellinger

(57) ABSTRACT

An articulated chain assembly includes standard links, a master link, and pins pivotably coupling together the standard links and master link. The master link includes a first half link and a second half link, and bolt holes extending through the first half link and the second half link. A first bolt is within a first one of the bolt holes and has a necked-down bolt shank defining a lesser necked-down axial length. A second bolt is within a second one of the bolt holes and includes a necked-down bolt shank defining a greater necked-down axial length. The first bolt and second bolt may have unequal full axial lengths.

20 Claims, 2 Drawing Sheets

(56) References Cited

U.S. PATENT DOCUMENTS

| | | |
|---|---|---|
| 10,641,307 B2 * | 5/2020 | Simpson ................ B21J 15/022 |
| 11,519,299 B2 * | 12/2022 | Rickis ....................... F02C 7/32 |
| 2008/0174175 A1 | 7/2008 | Livesay et al. |
| 2008/0292427 A1 * | 11/2008 | Rowe ...................... F16B 5/025 |
| | | 411/339 |
| 2009/0304477 A1 | 12/2009 | Dai |
| 2019/0092404 A1 | 3/2019 | Johannsen et al. |
| 2020/0047592 A1 | 2/2020 | Dai |

\* cited by examiner

MASTER LINK AND ARTICULATED CHAIN ASSEMBLY FOR MACHINE

TECHNICAL FIELD

The present disclosure relates generally to a master link in an articulated chain assembly, and more particularly to a master link including bolts structured to mitigate unequal clamping loads.

BACKGROUND

A variety of different types of machines have ground-engaging tracks consisting of a plurality of links coupled together to form a flexible, endless loop that extends around rotatable track-engaging elements. Mining, construction, forestry, roadbuilding and other industries all rely to a great extent upon machines having ground-engaging tracks. As with any machine system, it can be desirable to provide some means for facile disassembling of certain components for servicing or repair. A "master link" is provided in many ground-engaging tracks for this purpose, and a great many different designs have been developed over the years.

In one common class of master link designs multiple teeth are provided on separate master link portions or "half links" that can be interlocked to mate the master link portions together. Fasteners such as bolts may be used to secure the respective link portions together, and the master link positioned in a machine track where it operates much like any of the other links. When it is desirable to break the track for repair, servicing, shipping, et cetera, the fasteners coupling the link portions together are removed, allowing the track to be separated via disassembling the link portions. More than one master link can be used in a given track chain, and assembled tracks consisting of parallel track chains will typically have at least two master links. While the basic two-part master link design has proven to be quite useful, the ruggedness of many environments within which track-type machines operate can place a premium on durability and service life, and some existing master links tend to prematurely fail.

The number, arrangement, size, and thread configuration of bolts used to couple master link together have been the subject of engineering experimentation over the years. It is observed that in some instances thread galling, bolt head breakage, or other forms of failure or performance degradation can occur. United States Patent Application Publication No. 2008/0174175 to Livesay et al. is directed to a master link for a track including profiled surfaces of first and second link members having the form of a sinusoidal segment defined by a tooth and an adjacent recess. While Livesay et al. may have advantages in application, for the reasons discussed above and still others there is always room for improvement and alternative strategies in this field.

SUMMARY OF THE INVENTION

In one aspect, an articulated chain assembly includes a plurality of standard links, a master link, and a plurality of pins pivotably coupling together the plurality of standard links and the master link to form an elongate chain. The master link includes a first half link having a first outside surface and a first inside clamping surface, and a second half link having a second outside surface and a second inside clamping surface in facing contact with the first inside clamping surface. A first bolt hole in the master link extends between the first outside surface and first internal threads formed in the second half link and intersects each of the first clamping surface and the second clamping surface. A second bolt hole in the master link extends between the first outside surface and second internal threads within the second half link and intersects each of the first clamping surface and the second clamping surface. A first bolt within the first bolt hole defines a first bolt axis and includes a first bolt head, a first threaded end threadedly engaged with the first internal threads, and a first necked-down bolt shank defining a lesser necked-down axial length. A second bolt within the second bolt hole defines a second bolt axis and includes a second bolt head, a second threaded end threadedly engaged with the second internal threads, and a second necked-down bolt shank defining a greater necked-down axial length.

In another aspect, a master link for an articulated chain assembly includes a first half link having a first outside surface and a first inside clamping surface forming a first tooth set, and a second half link having a second outside surface and a second inside clamping surface forming a second tooth set and positionable in facing contact with the first inside clamping surface to interlock the first tooth set and the second tooth set. The first half link and the second half link together form a first bolt hole and a second bolt hole. Each of the first bolt hole and the second bolt hole includes an unthreaded section within the first half link and an internally threaded section within the second half link, and intersects the first clamping surface and the second clamping surface. A first bolt within the first bolt hole defines a first bolt axis and includes a first bolt head, a first threaded end threadedly engaged with the internally threaded section of the first bolt hole, and a first necked-down bolt shank defining a lesser necked-down axial length, A second bolt within the second bolt hole defines a second bolt axis and includes a second bolt head, a second threaded end threadedly engaged with the internally threaded section of the second bolt hole, and a second necked-down bolt shank defining a greater necked-down axial length.

In still another aspect, a master link for an articulated chain assembly includes a first half link having a first outside surface and a first inside clamping surface forming a first tooth set, and a second half link having a second outside surface and a second inside clamping surface forming a second tooth set. The first half link and the second half link together form a first bolt hole and a second bolt hole, each of the first bolt hole and the second bolt hole having an unthreaded section within the first half link and an internally threaded section within the second half link, and intersecting the first clamping surface and the second clamping surface. A first bolt within the first bolt hole defines a first bolt axis and includes a first bolt head, a first threaded end threadedly engaged with the internally threaded section of the first bolt hole, and a first bolt shank. A second bolt within the second bolt hole defines a second bolt axis and includes a second bolt head, a second threaded end threadedly engaged with the internally threaded section of the second bolt hole, and a second bolt shank. At least one of the first bolt shank or the second bolt shank is necked-down between the respective first bolt head or second bolt and first threaded end or second threaded end.

DETAILED DESCRIPTION

Figure 1:
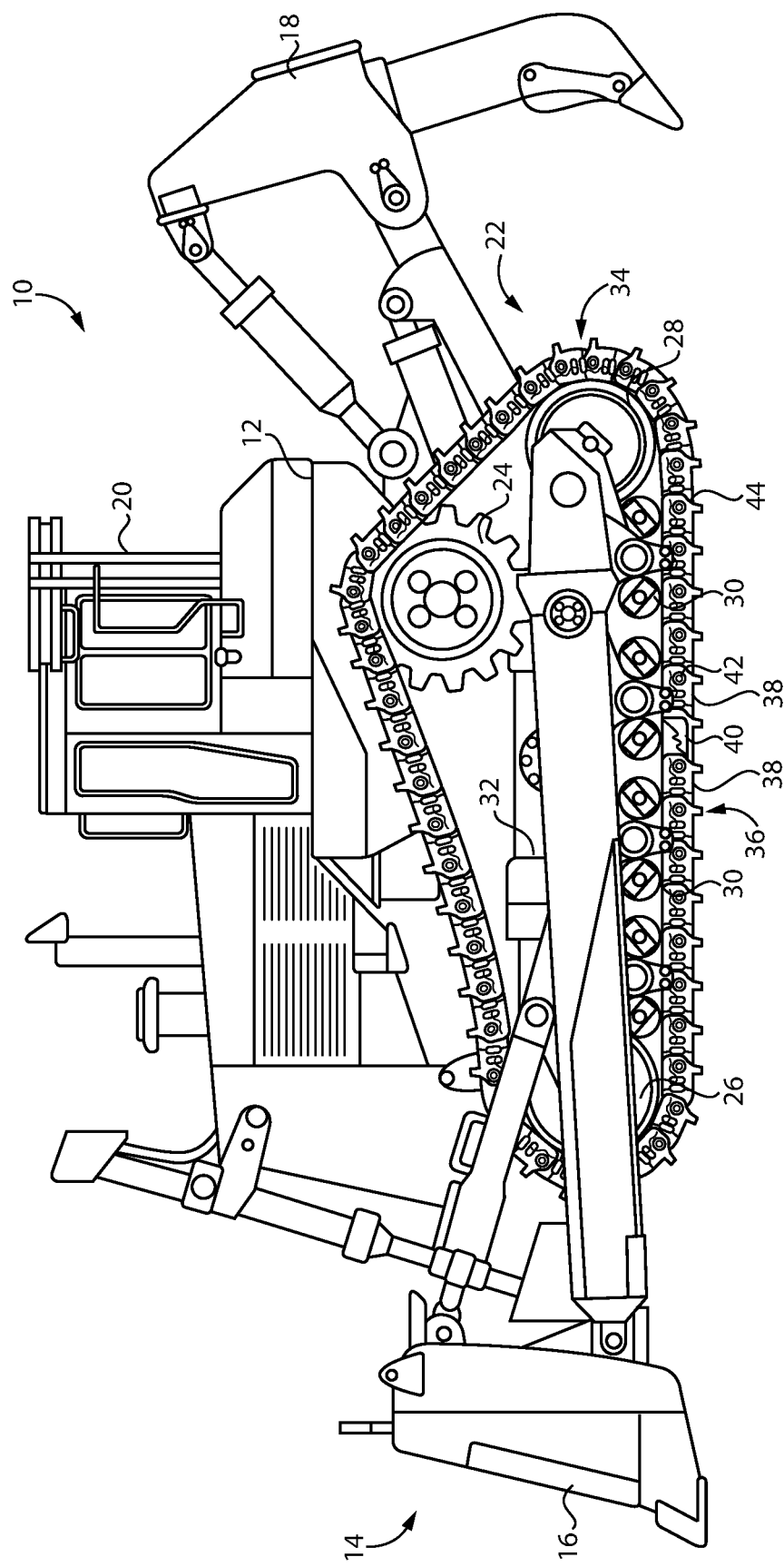
FIG. 1 is a side diagrammatic view of a machine, according to one embodiment.

Referring to FIG. 1, there is shown a machine 10 according to one embodiment. Machine 10 is shown in the context of a track-type tractor having a frame 12 with an operator cab 20 supported thereon, an implement system 14 and a ground-engaging track system 22. Implement system 14 includes a blade 16 supported at a front end of frame 12, and a ripper 18 supported at a back end of frame 12. In other embodiments, machine 10 might include a different type of off-highway machine, such as a track-type loader, an excavator, a mining shovel, a half-track machine, or still others. Embodiments are also contemplated where machine 10 includes a conveyer, a hoist system, or any of a variety of other machine types employing tracks or chains that can benefit from the teachings set forth herein. Ground-engaging track system 22 includes a drive sprocket 24, a front idler 26, a back idler 28, a plurality of track rollers 30, a track roller frame 32, and a ground-engaging track 34 extending about the various track system rotatable elements. Track 34 may be one of two similar or identical ground-engaging tracks positioned at opposite sides of frame 12, and includes an articulated chain assembly 36. Chain assembly 36 includes a plurality of standard links, a master link 40, and a plurality of track pins 42 pivotably coupling together standard links 38 and master link 40 end-to end to form an elongate chain 44. Elongate chain 44 may be one of two track chains, with a second chain hidden from view in the illustration of FIG. 1.

Chain 44, and the chain not visible in FIG. 1, may have a plurality of track shoes 46 attached to standard links 38 and to master link 40, or potentially formed integrally therewith, for ground-engaging traction and propulsion purposes well understood in the art. It should be appreciated that one or more master links might be within chain 44, and one or more master links within the chain hidden from view in FIG. 1. Track system 22 is shown with drive sprocket 24 in a so-called "high drive" arrangement. In other instances, drive sprocket 24 could be rearwardly positioned, generally in place of rear idler 28, with track 34 having an oval configuration extending about drive sprocket 24 and front idler 26. It will be recalled that track 34 and/or articulated chain assembly 36 are contemplated to have applications other than in off-highway equipment. An articulated chain assembly forming a total of one elongate chain, with or without shoes attached, having any number of standard links and any number of master links structured as contemplated herein may fall within the scope of the present disclosure.

Figure 2:
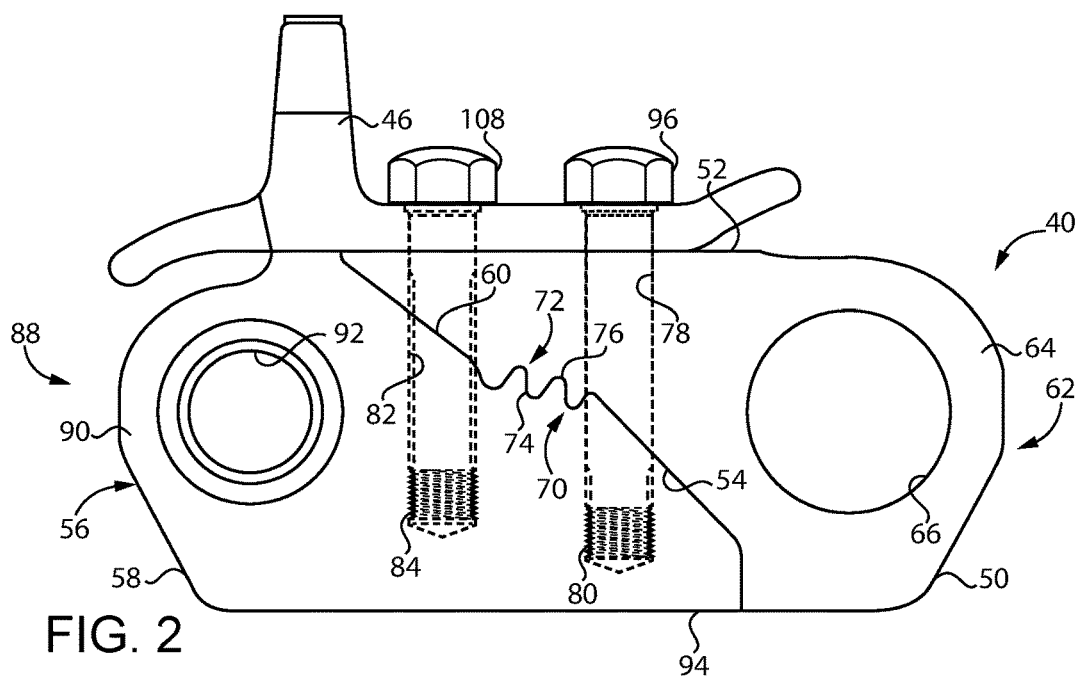
FIG. 2 is a side diagrammatic view of a master link and track shoe, according to one embodiment.

Referring also now to FIG. 2, master link 40 is there shown attached to a track shoe 46 as it might appear in a typical ground-engaging application. Master link 40 includes a first half link 50 with a first outside surface 52 and a first inside clamping surface 54. Master link 40 further includes a second half link 56 having a second outside surface 58 and a second inside clamping surface 60 in facing contact with first inside clamping surface 54. In a practical implementation, first inside clamping surface 54 forms a first tooth set 70 and second inside clamping surface 60 forms a second tooth set 72 interlocked with first tooth set 70. First inside clamping surface 54 and second inside clamping surface 60 are thus positionable in facing contact to interlock teeth of first tooth set 70 with teeth of second tooth set 72. The present disclosure is applicable to a master link having any number of teeth, or potentially no teeth. In a practical implementation, a number of teeth 74 in each one of first tooth set 70 and second tooth set 72 is a total of five or fewer in each respective tooth set, and in certain refinements a total of one tooth, two teeth, or three teeth.

A first bolt hole 78 is formed in master link 40 and extends between first outside surface 52 and first internal threads 80 formed in second half link 56. First bolt hole 78 intersects each of first inside clamping surface 54 and second inside clamping surface 60. A second bolt hole 82 is formed in master link 40 and extends between first outside surface 52 and second internal threads 84 within second half link 56. Second bolt hole 82 intersects each of first inside clamping surface 54 and second inside clamping surface 60. First bolt hole 78 and second bolt hole 82 are thus each formed by first half link 50 and second half link 56 together.

Figure 3:
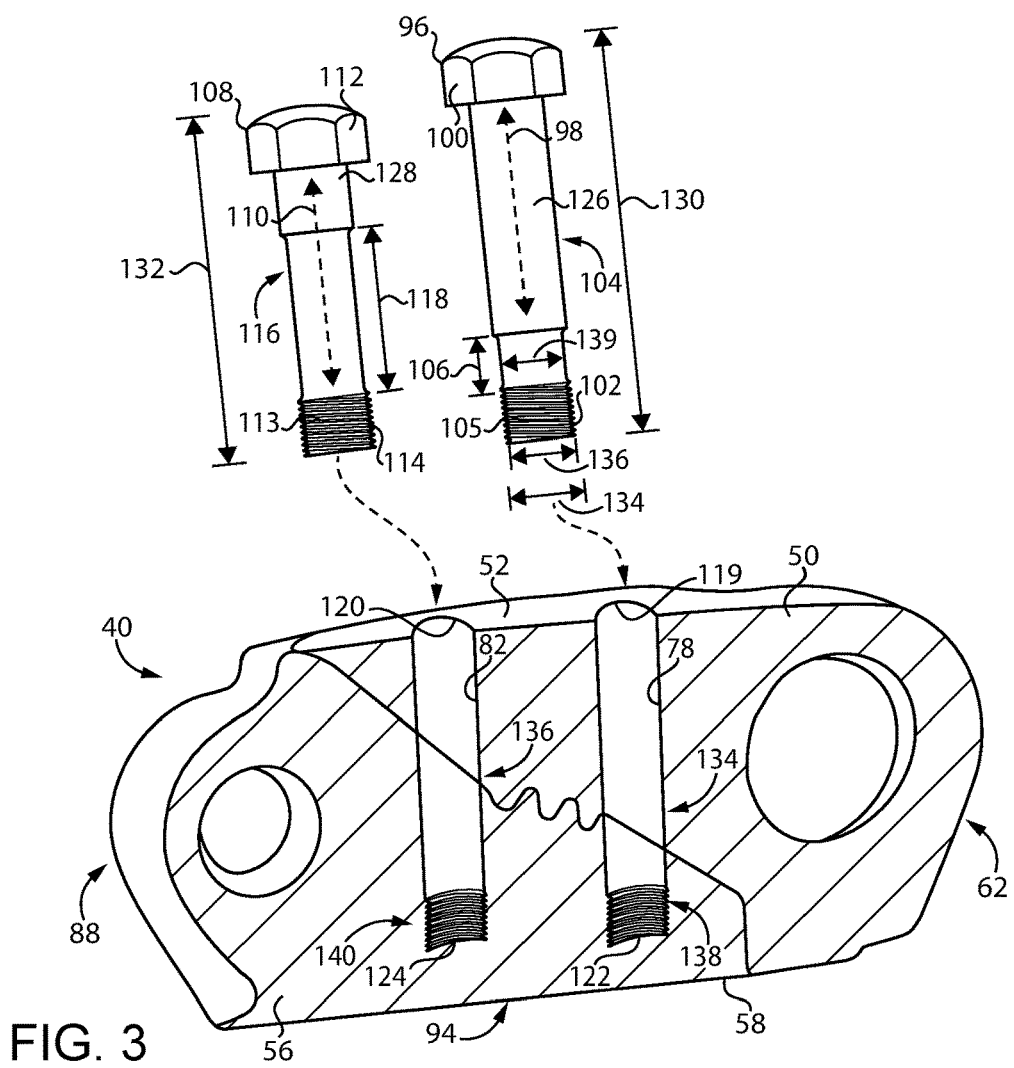
FIG. 3 is a partially sectioned side diagrammatic view of a master link, according to one embodiment.

Referring also now to FIG. 3, each of first bolt hole 78 and second bolt hole 82 may have an unthreaded section 134 and 136, respectively, within first half link 50, and an internally threaded section 138 and 140, respectively, within second half link 56. Each of unthreaded sections 134 and 136 may be formed in part within first half link 50 and in part with second half link 56 as illustrated. A first bolt 96 is within first bolt hole 78, and a second bolt 108 is within second bolt hole 82, features and functionality of which are further discussed below.

Master link 40 further includes a first link end 62, formed by first half link 50, and a second link end 88 formed by second half link 56, and may be elongate from first link end 62 to second link end 88. First link end 62 includes a first link strap 64, and second link end 88 includes a second link strap 90. First half link 50 may further have a first transverse bore 66 formed therein, and second half link 56 may have a second transverse bore 92 formed therein. First transverse bore 66 may include a bushing bore structured to receive a bushing that rotates or is fixed such as by interference-fitting. Second transverse bore 92 may include a pin bore structured to receive a track pin that can be fixed such as by interference-fitting. First transverse bore 66 and second transverse bore 92 may have different diameters, however, the present disclosure is not thereby limited. First bolt hole 78 and second bolt hole 82 may be spaced fore and aft between first transverse bore 66 and second transverse bore 92. It can also be noted from the Figures that first inside clamping surface 54 and second inside clamping surface 60 each slope fore and aft between first transverse bore 66 and second transverse bore 92. Also in the illustrated embodiment, first tooth set 70 and second tooth set 72 are confined in distribution between first bolt hole 78 and second bolt hole 80. "Confined in distribution" means that bolt holes 78 and 82 do not intersect teeth or tooth roots of either of first tooth set 70 or second tooth set 72, although the present disclosure is not thereby limited and in some embodiments either bolt hole could intersect one or more teeth or tooth roots.

As depicted in FIG. 2, track shoe 46 is clamped by first bolt 96 and second bolt 108 to first outside surface 52. First outside surface 52 may thus include a shoe-mounting surface, with each of first bolt hole 78 and second bolt hole 82 opening in first outside surface 50. As also shown in FIG. 3 first bolt hole 78 has a first bolt hole opening 119 in first outside surface 52 and second bolt hole 82 has a second bolt hole opening 120 in first outside surface 52. First bolt hole 78 includes a blind end 122 within second half link 56, and second bolt hole 82 has a blind end 124 also within second half link 56. First half link 50 and second half link 56 may together form a solid track rail 94, with track rail 94 being formed in part by second outside surface 58 and in part by an adjoining outside surface (not numbered) of first half link 50. When placed in service in track 34 track rollers 30, front idler 26, and back idler 28 may roll in contact with track rail 94 as track 34 is advanced about the various rotating elements. The present disclosure is not thereby limited, however, and a center tread idler configuration or still another configuration might be employed.

As noted above, chain assembly 36 and master link 40 include a first bolt 96 within first bolt hole 78, and a second bolt 108 within second bolt hole 82. First bolt 96 defines a first bolt axis 98 and includes a first bolt head 100, and a first threaded end 102 having external threads 105 threadedly engaged with first internal threads 80. Second bolt 108 defines a second bolt axis 110 and includes a second bolt head 112, and a second threaded end 114 including external threads 113 threadedly engaged with second internal threads 84. In the illustrated embodiment each of first bolt head 100 and second bolt head 112 includes a hex head having six outside tool engagement surfaces. In other embodiments, each of first bolt head 100 and second bolt head 112, or either one, could include inside tool engagement surfaces in the manner of a socket. Tool engagement surfaces of first bolt 96 and second bolt 108 could include any number in any suitable geometric arrangement.

First bolt 96 further includes a first necked-down bolt shank 104 defining a lesser necked-down axial length 106. Second bolt 108 includes a second necked-down bolt shank 116 defining a greater necked-down axial length 118. First bolt 96 may also define a greater full axial length 130, and second bolt 108 may define a lesser full axial length 132. First bolt 96 may also include an un-necked shank portion 126 within unthreaded section 134 of the first bolt hole 78 and second bolt 108 may include an un-necked shank portion 128 within unthreaded section 136 of second bolt hole 82, with un-necked shank portions 126 and 128 originating at the respective bolt head 100 and 112 and extending to the respective necked-down portions of bolt shanks 104 and 106.

As can also be seen in FIG. 3 first threaded end 102 defines a thread major diameter 134 and a thread minor diameter 136. Thread major diameter 134 is an outside diameter, normal to bolt axis 98, defined by a peripherally outermost extent of external threads 105. Thread minor diameter 136 is a peripherally innermost diameter defined by external threads 105, in other words a thread root diameter. Second threaded end 114 is analogously understood to define a thread major diameter and a thread minor diameter, although not specifically labeled. First necked-down bolt shank 104 defines a necked-down shank diameter 139 that is less than thread minor diameter 136. Second necked-down bolt shank 116 will be understood to define a necked-down shank diameter less than the respective thread minor diameter. The thread minor diameters and necked-down shank diameters defined by first bolt 96 and second bolt 108 may respectively be equal.

It will be recalled that first bolt 96 may be longer than second bolt 108, and that second bolt 108 may be necked-down along a relatively greater axial length than first bolt 96. Greater necked-down axial length 118 may exceed lesser necked-down axial length 106 by a factor of two or greater, and in a refinement by a factor of about three or greater. Also in a practical implementation a difference between greater necked-down axial length 118 and lesser necked-down axial length 106 may exceed a difference between greater full axial length 130 and lesser full axial length 132.

INDUSTRIAL APPLICABILITY

In certain master links bolts structured to clamp together half links may have a common torque turn specification. In other words, a prescribed installation torque for the respective bolts may be the same. Different length bolts, and potentially other factors such as service conditions and overall master link geometry, can result in unequal stress and material strain on the bolts as a longer bolt will typically diffuse stresses through more material. Unequal stress and material strain on the bolts has been observed to cause or exacerbate inter-granular stress crack formation, particularly at a minor diameter of a top thread of the shorter bolt. Bolt failure initiated by stress crack formation can cause failure of the master link. Even where failure does not occur, bolt stretch on one of the bolts can stretch the bolt beyond its yield strength and end up causing gapping between or among components in the master link, also potentially leading to failure or necessitating unplanned field service. Due, at least in part, to the lesser amount of material in a shorter bolt versus a longer bolt, breakage, or loosening that induces cyclical loading can thus present a considerable service life-limiting problem.

According to the present disclosure, necking-down one or both bolts in a master link can compensate for unequal bolt lengths and ultimately provide the same stress and material strain when specified torques for installation are applied. In the case of a shorter of two bolts the necked-down shank can drive stress and material strain that might otherwise concentrate in threads into the reduced diameter portion. Configurations contemplated here can also provide for a greater tolerance if different torques are applied such as where torque turn specifications are not followed. Utilizing necked-down bolts may also assist in implementation of relatively finer threads, driving stress into the necked-down portion, which can be desirable as finer threads may be less sensitive to errors in installation torque on the bolts.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An articulated chain assembly comprising:
   a plurality of links, a master link, and a plurality of pins pivotably coupling together the plurality of links and the master link to form an elongate chain;
   the master link including a first half link having a first outside surface and a first inside clamping surface, and a second half link having a second outside surface and a second inside clamping surface in facing contact with the first inside clamping surface;
   a first bolt hole in the master link extends between the first outside surface and first internal threads formed in the second half link and intersects each of the first clamping surface and the second clamping surface;
   a second bolt hole in the master link extends between the first outside surface and second internal threads within the second half link and intersects each of the first clamping surface and the second clamping surface;

a first bolt within the first bolt hole defining a first full axial length and a first bolt axis and having a first bolt head, a first threaded end threadedly engaged with the first internal threads, and a first necked-down bolt shank defining a lesser necked-down axial length;

a second bolt within the second bolt hole defining a second full axial length and a second bolt axis and having a second bolt head, a second threaded end threadedly engaged with the second internal threads, and a second necked-down bolt shank defining a greater necked-down axial length;

a track shoe clamped to the master link by the first bolt and the second bolt; and the lesser necked-down axial length, as a proportion of the first full axial length, is less than the greater necked-down axial length as a proportion of the second full axial length.

2. The articulated chain assembly of claim 1 wherein the first inside clamping surface forms a first tooth set, and the second inside clamping surface forms a second tooth set interlocked with the first tooth set.

3. The articulated chain assembly of claim 2 wherein a number of teeth in each one of the first tooth set and the second tooth set is a total of five or fewer.

4. The articulated chain assembly of claim 2 wherein:
the first half link has a first transverse bore formed therein, and the second half link has a second transverse bore formed therein;
the first bolt hole and the second bolt hole are spaced fore and aft between the first transverse bore and the second transverse bore; and
the first clamping surface and the second clamping surface slope fore and aft between the first transverse bore and the second transverse bore.

5. The articulated chain assembly of claim 1 wherein:
the chain includes a track chain;
the first outside surface includes a shoe-mounting surface, and each of the first bolt hole and the second bolt hole opens in the first outside surface; and
the first half link and the second half link together form a solid track rail opposite to the shoe-mounting surface.

6. The articulated chain assembly of claim 1 wherein each of the first bolt and the second bolt includes an un-necked shank portion extending between the respective bolt head and threaded end.

7. The articulated chain assembly of claim 1 wherein the first full axial length includes a greater full axial length, and the second full axial length includes a lesser full axial length.

8. The articulated chain assembly of claim 7 wherein a difference between the greater necked-down axial length and the lesser necked-down axial length exceeds a difference between the greater full axial length and the lesser full axial length.

9. A master link for an articulated chain assembly comprising:
a first half link having a first outside surface, and a first inside clamping surface forming a first tooth set;
a second half link having a second outside surface, and a second inside clamping surface forming a second tooth set and positionable in facing contact with the first inside clamping surface to interlock the first tooth set and the second tooth set;
the first half link and the second half link together forming a first bolt hole and a second bolt hole, each of the first bolt hole and the second bolt hole having an unthreaded section within the first half link and an internally threaded section within the second half link, and intersecting the first clamping surface and the second clamping surface, and the first tooth set and the second tooth set each including both a tooth and a tooth root formed between the first bolt hole and the second bolt hole;

a first bolt within the first bolt hole defining a first full axial length and a first bolt axis and having a first bolt head, a first threaded end threadedly engaged with the internally threaded section of the first bolt hole, and a first necked-down bolt shank defining a lesser necked-down axial length;

a second bolt within the second bolt hole defining a second full axial length and a second bolt axis and having a second bolt head, a second threaded end threadedly engaged with the internally threaded section of the second bolt hole, and a second necked-down bolt shank defining a greater necked-down axial length; and the lesser necked-down axial length, as a proportion of the first full axial length, is less than the greater necked-down axial length as a proportion of the second full axial length.

10. The master link of claim 9 wherein the first full axial length includes a greater full axial length, and the second full axial length includes a lesser full axial length.

11. The master link of claim 10 wherein the greater necked-down axial length exceeds the lesser necked-down axial length by a factor of two or greater.

12. The master link of claim 11 wherein a difference between the greater necked-down axial length and the lesser necked-down axial length exceeds a difference between the greater full axial length and the lesser full axial length.

13. The master link of claim 9 wherein the first bolt includes an un-necked shank portion within the unthreaded section of the first bolt hole, and the second bolt includes an un-necked shank portion within the unthreaded section of the second bolt hole.

14. The master link of claim 9 wherein:
the first half link has a first transverse bore formed therein, and the second half link has a second transverse bore formed therein; and
the first bolt hole and the second bolt hole are spaced fore and aft between the first transverse bore and the second transverse bore.

15. The master link of claim 14 wherein the first clamping surface and the second clamping surface slope fore and aft between the first transverse bore and the second transverse bore.

16. The master link of claim 9 wherein:
each of the first threaded end and the second threaded end defines a thread major diameter and a thread minor diameter; and
each of the first necked-down bolt shank and the second necked-down bolt shank defines a shank diameter that is less than the respective thread minor diameter.

17. The master link of claim 16 wherein the thread minor diameters are equal and the shank diameters are equal.

18. A master link for an articulated chain assembly comprising:
a first half link having a first outside surface and a first inside clamping surface forming a first tooth set;
a second half link having a second outside surface and a second inside clamping surface forming a second tooth set;
the first half link and the second half link together forming a first bolt hole and a second bolt hole, each of the first bolt hole and the second bolt hole having an unthreaded section within the first half link and an internally threaded section within the second half link, and intersecting the first clamping surface and the second clamping surface;

a first bolt within the first bolt hole defining a first bolt axis and having a first bolt head, a first threaded end threadedly engaged with the internally threaded section of the first bolt hole and defining a thread major diameter and a thread minor diameter, and a first bolt shank;

a second bolt within the second bolt hole defining a second bolt axis and having a second bolt head, a second threaded end threadedly engaged with the internally threaded section of the second bolt hole and defining a thread major diameter and a thread minor diameter, and a second bolt shank;

at least one of the first bolt shank or the second bolt shank is necked-down between the respective first bolt head or second bolt head and first threaded end or second threaded end, and defines a necked-down shank diameter that is less than the respective thread minor diameter; and the thread minor diameter of the first bolt and the thread minor diameter of the second bolt are equal.

19. The master link of claim 18 wherein:

the first bolt defines a first full axial length, and the second bolt defines a second full axial length different from the first full axial length; and the first bolt shank is necked-down and defines a first necked-down axial length, and the second bolt shank is necked-down and defines a second necked-down axial length different from the first necked-down axial length.

20. The master link of claim 19 wherein:

the first half link has a first transverse bore formed therein, and the second half link has a second transverse bore formed therein;

the first bolt hole and the second bolt hole are spaced fore and aft between the first transverse bore and the second transverse bore; and the first full axial length is greater than the second full axial length, and the first necked-down axial length is less than the second necked-down axial length.

* * * * *